US005317365A

United States Patent [19]

Tschiderer et al.

[11] Patent Number: 5,317,365

[45] Date of Patent: May 31, 1994

[54] SUPPLY HOPPER FOR FANFOLD PAPER STACKS

[75] Inventors: Paul E. Tschiderer, Geneseo; Gary P. Lawniczak, Rochester, both of N.Y.

[73] Assignee: Eastman Kodak Company, Rochester, N.Y.

[21] Appl. No.: 984,654

[22] Filed: Dec. 2, 1992

[51] Int. Cl.$^5$ .............................................. G03B 27/62

[52] U.S. Cl. ...................................... 355/75; 355/309

[58] Field of Search .................................. 355/75, 309

[56] References Cited

U.S. PATENT DOCUMENTS

| | | | |
|---|---|---|---|
| H17 | 2/1986 | Wenthe, Jr. | 226/76 |
| 2,493,411 | 1/1950 | Lanegan et al. | 271/2.4 |
| 3,536,239 | 10/1970 | Strong | 226/1 |
| 4,087,172 | 5/1978 | VanDongen | 355/14 |
| 4,264,200 | 4/1981 | Tickner et al. | 355/75 |
| 4,300,710 | 11/1981 | DuBois et al. | 226/74 |
| 4,530,689 | 7/1985 | Ringer, Sr. | 493/410 |
| 4,579,449 | 4/1986 | Leroy | 355/75 |

*Primary Examiner*—Monroe H. Hayes
*Attorney, Agent, or Firm*—Lawrence P. Kessler

[57] ABSTRACT

A supply hopper for holding a stack of fanfold paper and guiding such fanfold paper for reliable feeding as it is withdrawn from the supply hopper. The supply hopper comprises a tray for supporting a stack of fanfold paper, the tray including a base member oriented at an angle in the range of between 25°-45° from the horizontal. A stop member is connected to the base member along the lower marginal edge thereof, the stop member and the base member forming an included angle of substantially 90°. Further, a guide member is supported by the tray substantially above a fanfold paper stack supported on the tray at a height sufficient to lift the topmost individual panel of the stack at least partially off the stack when the fanfold paper is threaded over the guide member. A bail assembly is connected to the tray extending away from the base member of the tray on the opposite side of the stop member from the base member. As such, the bail assembly acts as a damper on fanfold paper being withdrawn from the stack of fanfold paper passing from such stack supported on the tray over the guide member and below the bail assembly.

21 Claims, 4 Drawing Sheets

SUPPLY HOPPER FOR FANFOLD PAPER STACKS

BACKGROUND OF THE INVENTION

The present invention relates in general to feeding of fanfold paper, and more particularly, to a supply hopper which in an operative position supports a fanfold paper stack for reliable feeding to a reproduction apparatus, and is readily collapsible to a storage position.

Computer information output is commonly printed on a continuous run of paper. Such paper is typically an elongated web containing perforations along spaced transverse lines for dividing the web into uniform lengths or individual panels in the longitudinal direction. The perforations form weakening lines in the web which facilitate folding of the web into a stack, with alternate lines forming opposing edges of the stack. The elongated web of such perforation-containing construction is commonly referred to as continuous forms or fanfold paper.

In printing computer information output on fanfold paper, the fanfold paper is fed from a stack to a line or page printer, or the like, where the individual panels are imprinted with desired information and then discharged into a receptacle in a manner to reform the stack. Duplicates of selected individual panels of the stack can be made by dividing the fanfold paper into its individual panels by separation along the weakening lines, and thereafter copying the selected individual panels on any well known reproduction apparatus. In order to improve handling of fanfold paper for copying and eliminate the need to separate individual panels for reproduction, feeders have been designed for use with exemplary reproduction apparatus where the entire fanfold paper stack, or any particular portion thereof, can be duplicated by feeding the fanfold paper from the stack, unseparated, by means of a conveyor, to a reproduction apparatus for copying and discharging the fanfold paper into a receptacle in a manner to reform the stack. An example of a fanfold paper feeder associated with a reproduction apparatus for copying fanfold paper is shown and described in VanDongen U.S. Pat. No. 4,087,172, issued May 2, 1978 or Tickner et al. U.S. Pat. No. 4,264,200, issued Apr. 28, 1981.

A supply hopper for a stack of fanfold paper to be conveyed to the reproduction apparatus is shown and described in Leroy U.S. Pat. No. 4,579,449, issued Apr. 1, 1986. The supply hopper of the Leroy patent is collapsible into a compact storage position relative to the reproduction apparatus, and easily erected to support and guide the fanfold paper into operative association with the reproduction apparatus for copying thereof when desired. While the described supply hopper has proven generally reliable, under certain circumstances it fails to permit transport of the fanfold paper by the conveyor in a manner which maintains the fanfold paper stack in the proper orientation without spilling of the stack. Further, it may cause damage to the fanfold paper such as by tearing of individual panels of the stack or stalling of the fanfold paper in the feeder conveyor.

SUMMARY OF THE INVENTION

In view of the foregoing discussion, this invention is directed to a supply hopper for holding a stack of fanfold paper and guiding such fanfold paper for reliable feeding as it is withdrawn from the supply hopper. The supply hopper comprises a tray for supporting a stack of fanfold paper, the tray including a base member oriented at an angle in the range of between 25°–45° from the horizontal. A stop member is connected to the base member along the lower marginal edge thereof, the stop member and the base member forming an included angle of substantially 90°. Further, a guide member is supported by the tray substantially above a fanfold paper stack supported on the tray at a height sufficient to lift the topmost individual panel of the stack at least partially off the stack when the fanfold paper is threaded over the guide member. A bail assembly is connected to the tray extending away from the base member of the tray on the opposite side of the stop member from the base member. As such, the bail assembly acts as a damper on fanfold paper being withdrawn from the stack of fanfold paper passing from such stack supported on the tray over the guide member and below the bail assembly.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
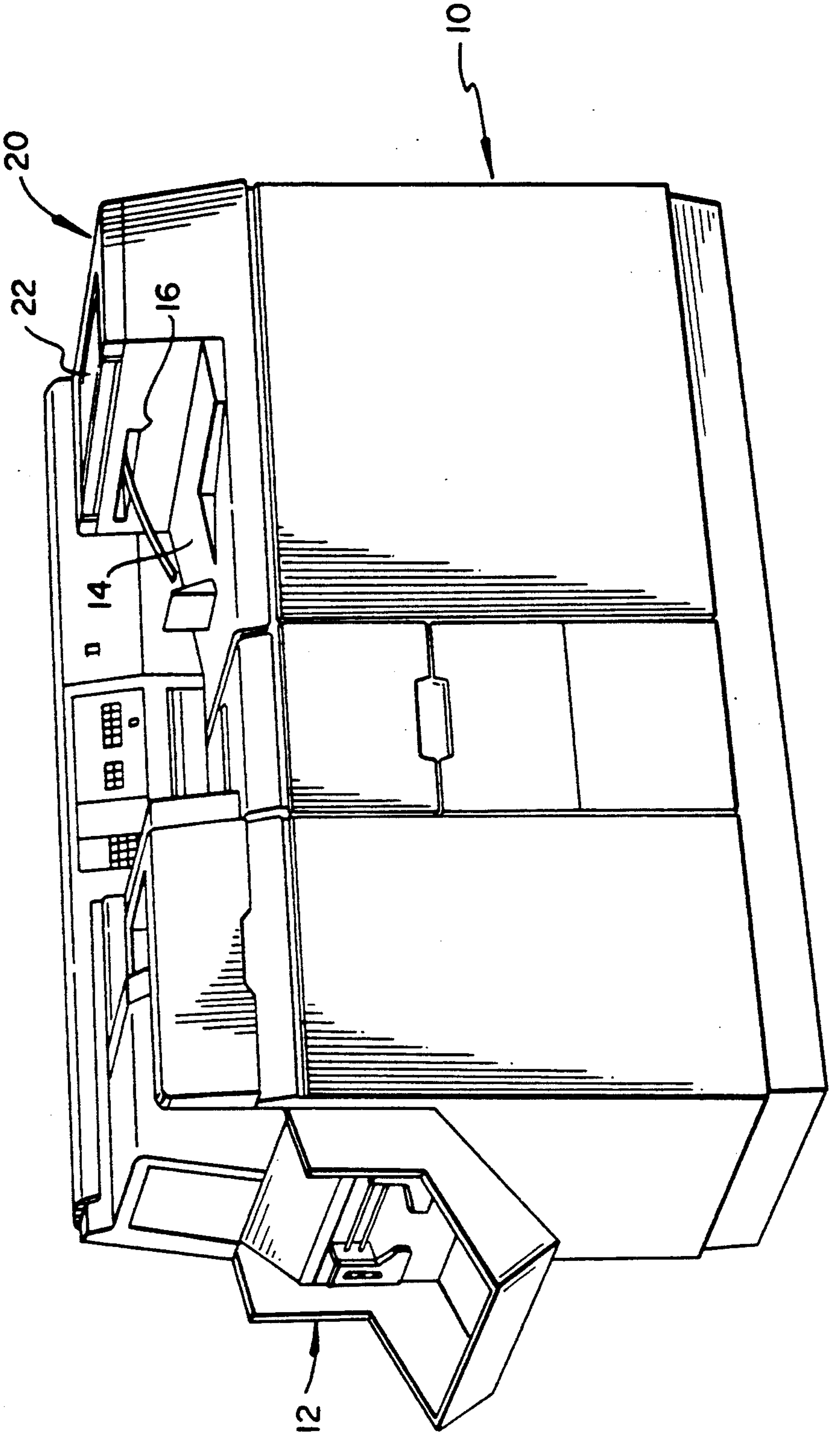
FIG. 1 is a view, in perspective, of an exemplary reproduction apparatus having a fanfold paper transport unit and a fanfold paper supply hopper, in its storage position, according to this invention.
Figure 2:
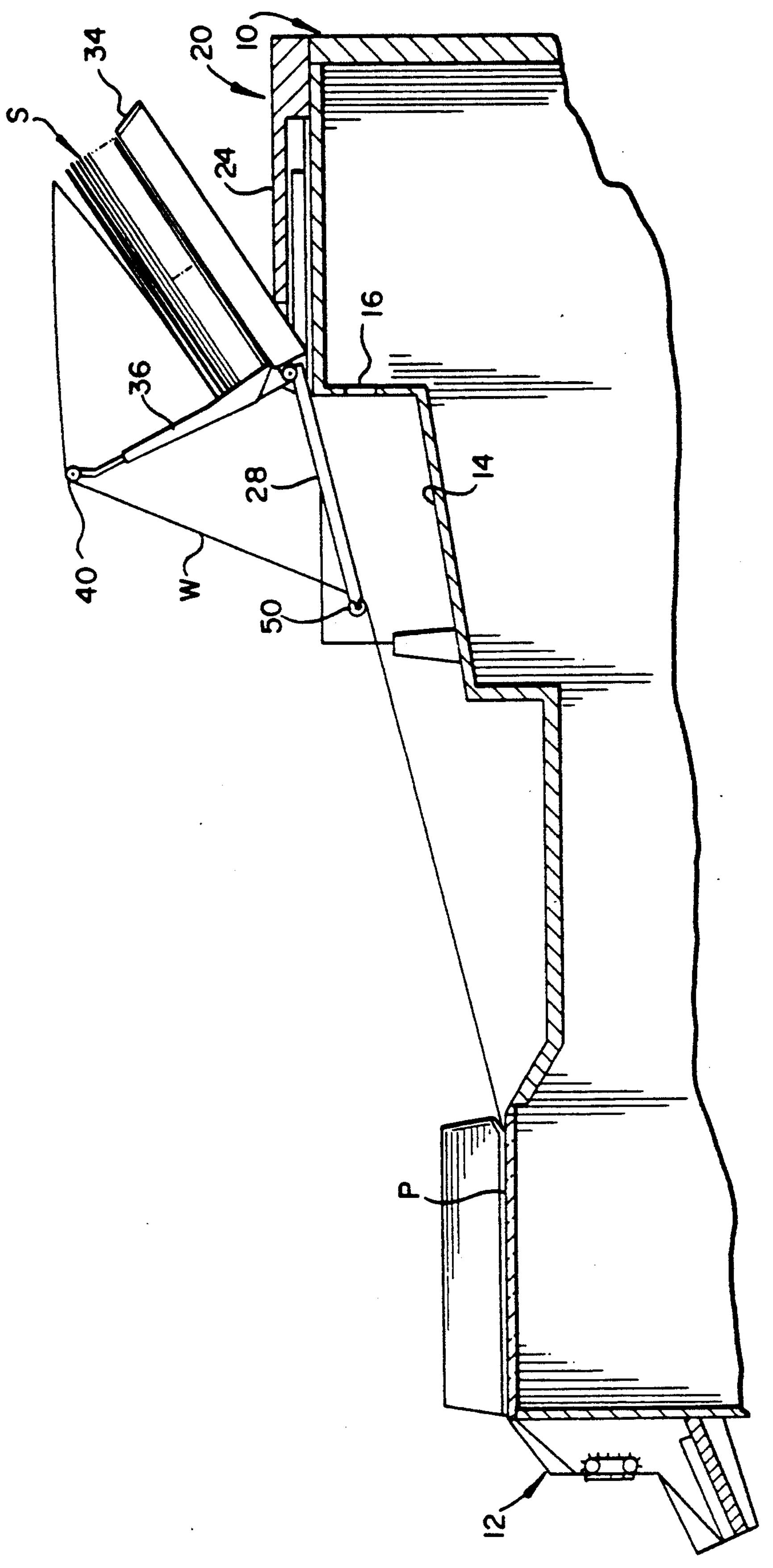
FIG. 2 is a side elevational view, on an enlarged scale, of the fanfold paper supply hopper according to this invention in its operative position in relation to the reproduction apparatus of FIG. 1, with portions removed to facilitate viewing.

Referring now to the accompanying drawings, FIGS. 1 and 2 show an exemplary reproduction apparatus, designated by the numeral 10, capable of operating in a mode for making copies of information contained in individual panels of fanfold paper. The reproduction apparatus 10 includes a fanfold paper feeder drive unit 12 for selectively transporting the fanfold paper across the platen P of the reproduction apparatus where they are respectively exposed for copying. An output hopper 14 located adjacent to an exit aperture 16 receives copies made of the individual panels of the fanfold paper by the reproduction apparatus.

A compact collapsible supply hopper, according to this invention, designated generally by the numeral 20, is shown in its collapsed storage position on the housing of the reproduction apparatus above the exit aperture 16. In its storage position, the supply hopper 20 provides a substantially flat surface which forms a suitable work surface 22 for resting documents to be copied or reproductions of copied documents for example. In its operative erected position (see FIGS. 2 and 5), the supply hopper 20 supports a stack of fanfold paper, designated by the letter S (shown in phantom in FIG. 5), and reliably guides the web W of fanfold paper across the platen P of the reproduction apparatus 10 to the feeder drive unit 12 for desired transport of the web for copying of selected individual panels of the fanfold paper. Of course, the reproduction apparatus 10 and feeder drive unit 12 are only illustrative, the supply hopper 20 being suitable for use with any other well known reproduction apparatus capable of making copies from the individual panels of the unseparated web of fanfold paper.

The supply hopper 20, according to this invention, includes a housing 24 attached to the housing of the reproduction apparatus 10 above the exit opening 16, with the top of the supply hopper housing forming a portion of the work surface 22. The housing 24 is open at one end 24*a*. Opposed slide rails 26 are respectively located on the upstanding side walls 24*b* of the housing and communicate with the opening 24*a*. A pair of slide members 28 ride in the pair of slide rails 26 respectively. The slide members 28 support the operative elements 30 of the supply hopper 20, and enable such elements to be moved to a storage position within the housing 24 (see FIG. 3) or to an operative erected position (see FIG. 5).

The operative elements 30 of the supply hopper 20 include a tray 32 having a base member 34 and a cooperating stop member 36. The base member 34 defines a substantially planar surface 34*a* for supporting a stack of fanfold paper S. The opposite side of the base member 34 defines a substantially planar surface 34*b* which serves as a portion of the work surface 22 when the supply hopper is in its collapsed storage position. The base member 34 and the stop member 36 of the tray 32 are mounted for pivotal movement on a hinge assembly 38 supported by, and extending between, the slide members 28 adjacent to one end thereof.

A guide member 40, for example in the form of an elongated roll bar, is supported by a pair of arms 42 extending from the stop member 36. The arms 42, which may be constructed in any well known manner so as to be adjustable in length, locate the guide member 40 at a predetermined distance from the hinge assembly 38. Such predetermined distance is selected so that the guide member 40 will assume an elevation above the base member 34 of the tray 32 whereby, when the supply hopper 20 is in its operative erected position, the topmost individual panel (designated by the letter T in FIG. 5) of a stack of fanfold paper supported on the base member is at least partially lifted off the stack when the web of fanfold paper is threaded over the guide member to the feeder drive unit 12. This assures that the individual panels of the web W of the fanfold paper readily breaks lose from the stack S without damage to the fanfold paper. The predetermined distance is equal to approximately twice the initial height of the stack of fanfold paper when supported in the tray 32. .

A bail assembly 50, for example in the form of an elongated roll bar, is supported by the slide members 28 and extends therebetween adjacent to the ends opposite the ends supporting the hinge assembly 38. By this arrangement, the bail assembly 50 is in effect connected to the tray 32, and in the operative erected position of the supply hopper 20 (see FIGS. 2 and 5), extends away from the base member 34 of said tray on the opposite side of the stop member 36 from the base member. The web W of the fanfold paper from the stack S is threaded (from over the guide member 40) under the bail assembly 50 to the drive unit 12. As such, the bail assembly 50 acts as a damper on the web W of the fanfold paper being withdrawn from a stack S of fanfold paper passing from such stack supported on the base member 34 over the guide member 40 and below the bail assembly. Such path for the web of the fanfold paper prevents damage to the fanfold paper. Further, the location of the bail assembly 50 (in the operative erected position of the supply hopper 20) lowers the angle of the fanfold paper web W as it is transported toward and across the platen P of the reproduction apparatus 10 by the feeder drive unit 12. This also serves to prevent damage to the fanfold paper web.

Figure 5:
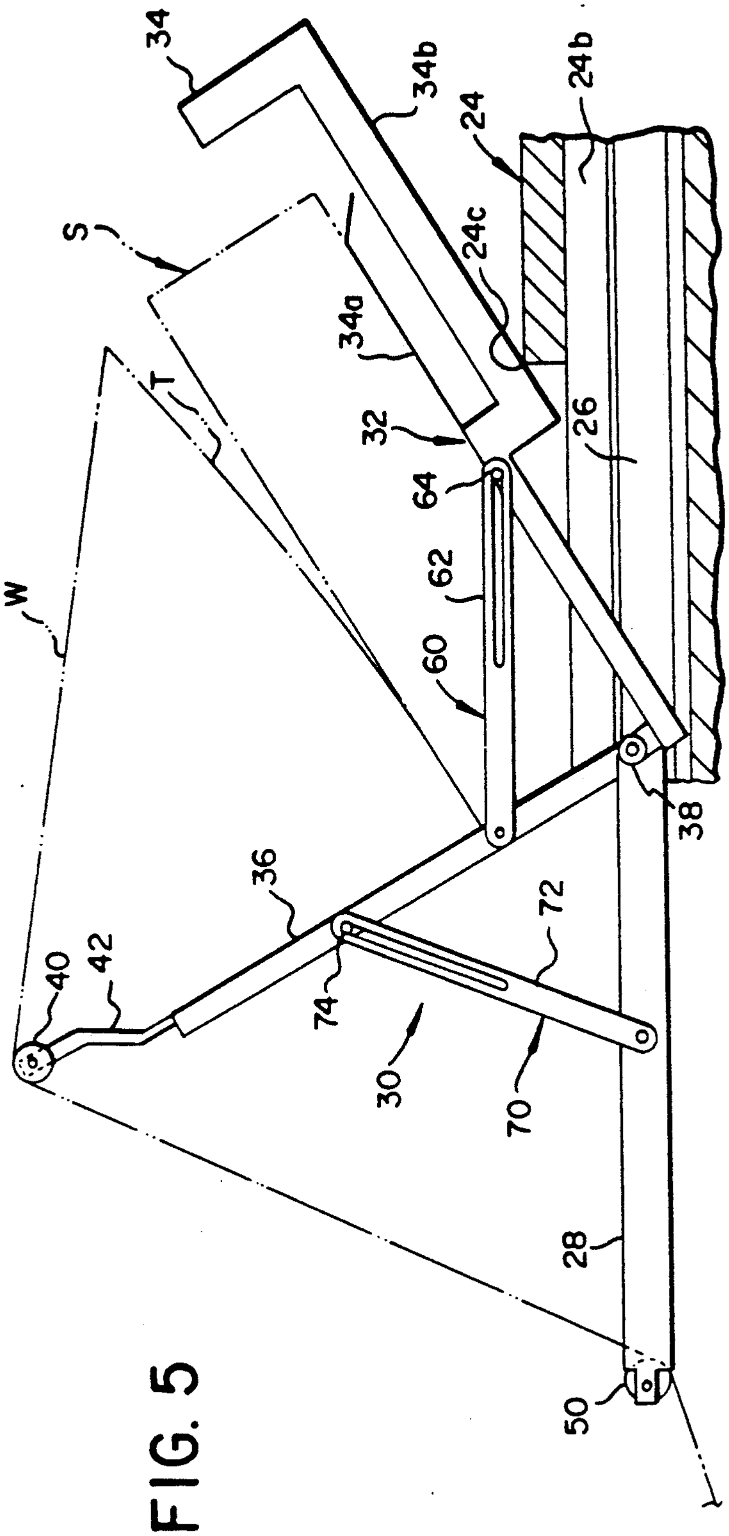
FIG. 5 is a side elevational view, on an enlarged scale with portions removed to facilitate viewing, of the fanfold paper supply hopper according to this invention in its operative position.
Figure 3:
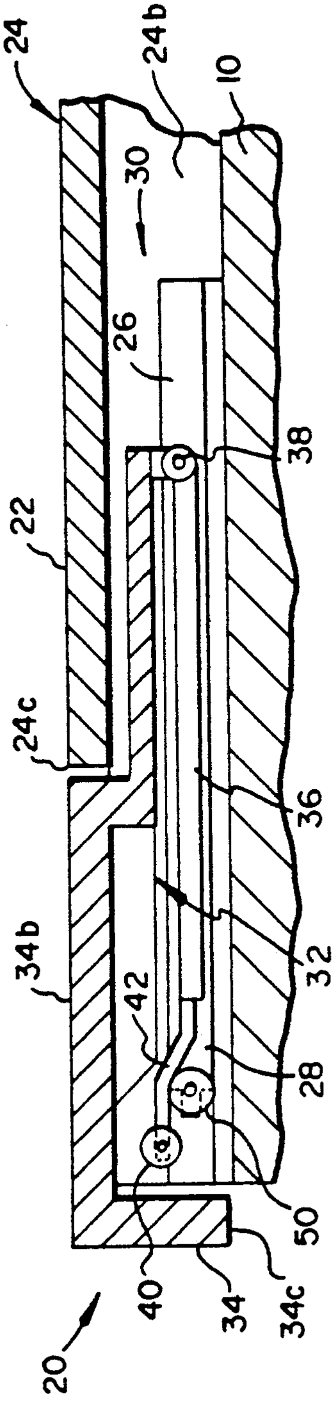
FIG. 3 is a side elevational view, on a still further enlarged scale with portions removed to facilitate viewing, of the fanfold paper supply hopper, according to this invention, in its storage position.

In order for the elements 30 of the supply hopper 20 to cooperatively move from their location in the collapsed storage position shown in FIG. 3 to their location in the operative erected position shown in FIGS. 2 and 5, base member 34 is connected to the stop member 36 by a linkage assembly 60, and the stop member is in turn connected to the bail assembly 50 by a linkage assembly 70. The linkage assembly 60 includes a pair of slotted arms 62 pivotally connected to the stop member 36 along opposite marginal edges thereof (only one arm shown in the drawings). The slots 62*a* of the arms 62 respectively receive pins 64 extending from the base member 34.

The linkage assembly 60 serves to locate the stop member 36 so as to define an included angle of approximately 90° between the stop member and the base member when the supply hopper 20 is in its operative erected position, and further enables the stop member to pivot into a nesting relation with the base member when the supply hopper is in its storage position. Similarly, the linkage assembly 70 includes a pair of slotted arms 72 pivotally connected to the slide members 28. The slots of the arms 72 respectively receive pins 74 extending from the stop member 36. The linkage assembly 70 serves to locate the stop member 36 relative to the bail assembly 50 when the supply hopper 20 is in its operative erected position, and further enables the stop member to pivot into a nesting relation with the bail assembly when the supply hopper is in its storage position.

Figure 4:
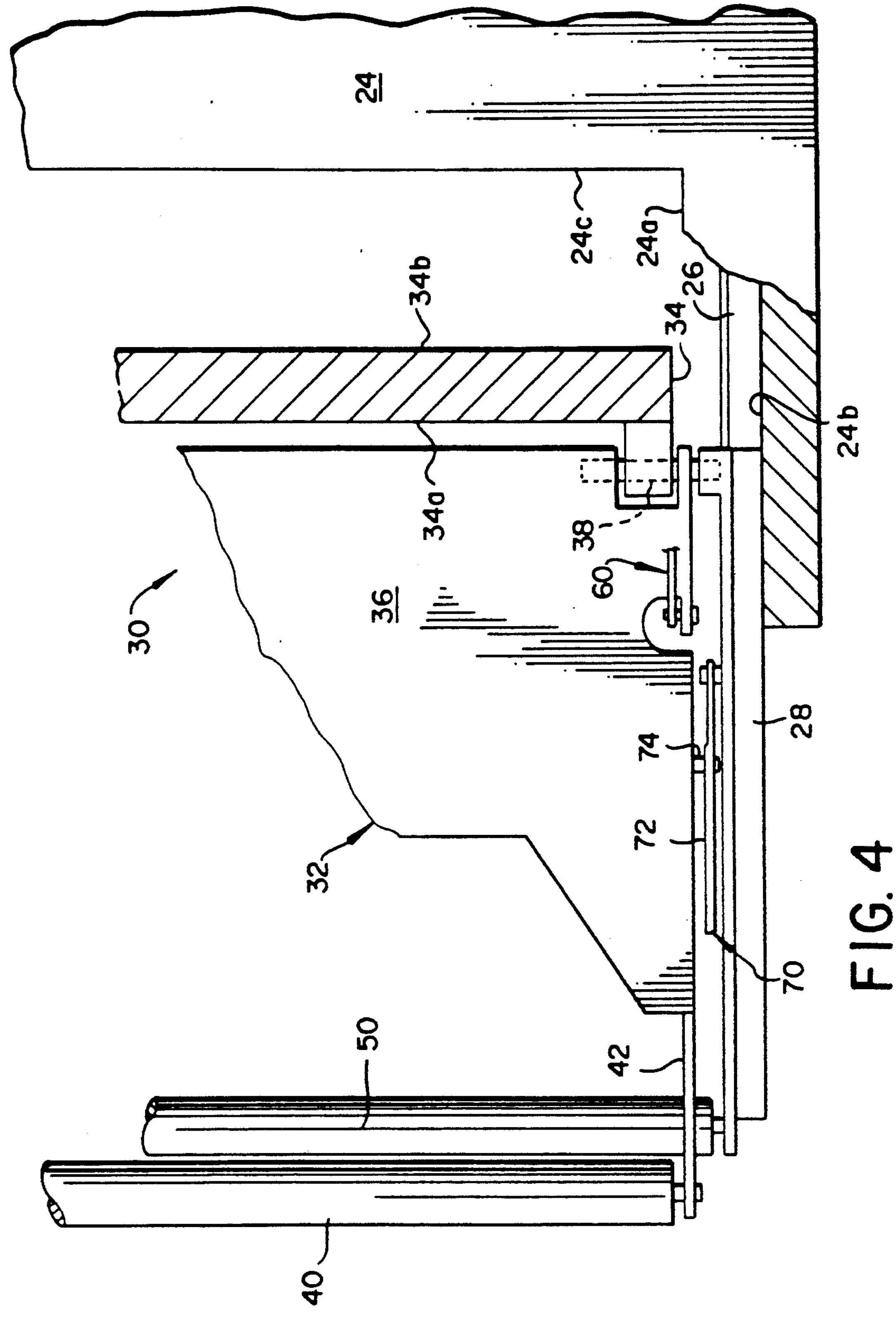
FIG. 4 is a top plan view, on an enlarged scale, of a portion of the fanfold paper supply hopper according to this invention in a position intermediate its storage position and its operative position, with portions broken away or removed to facilitate viewing.

With this arrangement, the operative elements 30 are moved from the collapsed storage position to the operative erected position in the following manner. In their nested condition, the elements 30 are manually pulled outwardly from the supply hopper housing 24, through the opening 24*a*, by gripping and pulling on the end 34*c* of the base member 34. The slide members 28 slide in the rails 26 until they are fully extended to reach a stop (not shown). With the elements fully extended from the housing 24, the base member 34 is pivoted about the hinge assembly 38 (see FIG. 4 where the base member 34 has been moved to an intermediate, substantially vertical position). As the base member 34 continues to pivot about the hinge assembly, the linkage assembly 60 locates the stop member 36 at the above described included angle of approximately 90°. When the supply hopper 20 is finally in its operative erect position, the linkage assembly 70 aids in maintaining the base member 34 and the bail assembly 50 in their desired relative positions.

Further, when the supply hopper 20 is finally in its operative erected position, the surface 34*b* of the base member 34 engages the edge 24c of the supply hopper housing opening 24a. As such, the base member 34 is maintained at an angle in the range of between 25°–45° from the horizontal, and preferably approximately 35°. Once the elements 30 are erected, a stack S of fanfold paper is positioned on the surface 34a of the base member 34 with an edge of the stack against the stop member 36. The fanfold paper is then threaded over the guide member 40, under the bail assembly 50, across the platen P, and into the feeder drive unit 12. Individual panels of the web W of the fanfold paper can then be selectively copied by the reproduction apparatus 10 by advancing the web across the platen with the feeder drive unit. It should be pointed out that a stack of fanfold paper supported on the base member at the desired angle facilitates transporting of individual panels from the stack while assuring that the stack does not spill.

At the completion of the desired reproduction of individual panels of the fanfold paper, the supply hopper can readily be returned to its collapsed storage position from the operative erected position. This is of course simply accomplished in the manner opposite to the erecting procedure as described by folding the elements 30 into their nested positions and pushing the nested arrangement into the housing 24. The supply hopper 20 is then essentially out of the way, and copies of other information can readily be made by the reproduction apparatus 10 without interference therefrom. As noted above, the surface 34b of the base member, in fact, serves as a portion of the work surface 22, enabling unobstructed use of the top surface of the reproduction apparatus as if no supply hopper were present.

The invention has been described in detail with particular reference to preferred embodiment thereof, but it will be understood that variations and modifications can be effected within the spirit and scope of the invention as set forth in the claims.

What is claimed is:

1. A supply hopper for holding a stack of fanfold paper and guiding such fanfold paper for reliable feeding as it is withdrawn from said supply hopper, said supply hopper comprising:

a tray, in an operative erected position, for supporting a stack of fanfold paper, said tray including a base member oriented at an angle in the range of between 25°–45° from the horizontal, and a stop member connected to said base member along the lower marginal edge thereof, said stop member and said base member forming an included angle of substantially 90°;

a guide member supported by said tray, in an operative erected position, substantially above a fanfold paper stack supported on said tray at a height sufficient to lift the topmost individual panel of said stack at least partially off said stack when the fanfold paper is threaded over said guide member; and a bail assembly, in an operative erected position, connected to said tray extending away from said base member of said tray on the opposite side of said stop member from said base member, said bail assembly acting as a damper on fanfold paper being withdrawn from the stack of fanfold paper passing from such stack supported on said tray over said guide member and below said bail assembly.

2. The fanfold paper stack supply hopper of claim 1 wherein said base member is oriented at an angle of between 35° from the horizontal.

3. The fanfold paper stack supply hopper of claim 1 wherein said guide member is supported by said tray at a height of approximately twice the height of a fanfold paper stack supported on said tray.

4. The fanfold paper stack supply hopper of claim 1 wherein said base member is oriented at an angle of between 35° from the horizontal, and said guide member is supported by said tray at a height of approximately twice the height of a fanfold paper stack on said tray.

5. The fanfold paper stack supply hopper of claim 1 wherein said tray, said guide member, and said bail assembly are collapsible from their operative erected position into a compact substantially flat arrangement for storage.

6. The fanfold paper stack supply hopper of claim 5 further including a housing, and wherein said tray, said guide member, and said bail assembly are arranged to lie in a nested relation when collapsed from their operative erected position, and means for sliding such nested tray, guide member, and bail assembly into said housing for storage.

7. The fanfold paper stack supply hopper of claim 6 wherein said sliding means includes a pair of slide rails located within said housing in opposed relationship, a pair of slide members associated with said pair of slide rails respectively for sliding movement therein, and means for supporting said tray, said guide member, and said bail assembly by said slide members.

8. The fanfold paper stack supply hopper of claim 7 wherein said supporting means of said sliding means includes a hinge assembly extending between said pair of slide members, said tray being supported by said hinge assembly for pivotal movement with respect thereto.

9. The fanfold paper stack supply hopper of claim 8 wherein said hinge assembly independently supports said base member and stop member of said tray for pivotal movement, and wherein a linkage assembly connects said base member to said stop member to enable said base member and said stop member to assume the nested relation in the storage position and have the 90° included angle relation when the supply hopper is in its operative erected position.

10. The fanfold paper stack supply hopper of claim 9 wherein said stop member includes means for supporting said guide member.

11. The fanfold paper stack supply hopper of claim 9 wherein said bail assembly is supported by said slide members at an end thereof opposite said hinge assembly.

12. The fanfold paper stack supply hopper of claim 9 wherein said stop member includes means for supporting said guide member, and said bail assembly is supported by said slide members at an end thereof opposite said hinge assembly.

13. The fanfold paper stack supply hopper of claim 5 wherein said base member of said tray includes a first surface adapted to support a stack of fanfold paper, and a second surface substantially opposite thereto forming an extension of said housing when said tray is collapsed into its compact substantially flat arrangement for storage.

14. For use with a reproduction apparatus including a fanfold paper feeder drive unit for feeding fanfold paper in relation with the reproduction apparatus so as to enable the reproduction apparatus to make copies of individual panels thereof, a supply hopper for holding a stack of fanfold paper and guiding such fanfold paper for reliable feeding as it is withdrawn from said supply hopper and transported by said feeder drive unit, said supply hopper comprising:

a housing mounted on the reproduction apparatus;

a tray, in an operative erected position, associated with said housing for supporting a stack of fanfold paper, said tray including a base member engaging a portion of said housing so as to be oriented at an angle in the range of between 25°-45° from the horizontal, and a stop member connected to said base member along the lower marginal edge thereof, said stop member and said base member forming an included angle of substantially 90°;

a guide member supported by said stop member of said tray, in an operative erected position, substantially above a fanfold paper stack on said base member of said tray at a height sufficient to lift the topmost individual panel of said stack at least partially off said stack when the fanfold paper is threaded over said guide member; and a bail assembly, in an operative erected position, connected to said tray extending away said base member of said tray on the opposite side of said stop member from said base member, said bail assembly acting as a damper on fanfold paper being withdrawn from the stack of fanfold paper passing from such stack supported on said tray over said guide member and below said bail assembly.

15. The fanfold paper stack supply hopper of claim 14 wherein said base member is oriented at an angle of between 35° from the horizontal.

16. The fanfold paper stack supply hopper of claim 14 wherein said base member is oriented at an angle of between 35° from the horizontal, and said guide member is supported by said tray at a height of approximately twice the height of a fanfold paper stack supported on said tray.

17. The fanfold paper stack supply hopper of claim 14 wherein said tray, said guide member, and said bail assembly are interconnected so as to be pivotally arranged with one another for collapsible association into a nested relation, and means for sliding such nested tray, guide member, and bail assembly into said housing for storage.

18. The fanfold paper stack supply hopper of claim 17 wherein said sliding means includes a pair of slide rails located within said housing in opposed relationship, a pair of slide members associated with said pair of slide rails respectively for sliding movement therein, and means for supporting said tray, said guide member, and said bail assembly by said slide members.

19. The fanfold paper stack supply hopper of claim 18 wherein said supporting means of said sliding means includes a hinge assembly extending between said pair of slide members, said tray being supported by said hinge assembly for pivotal movement with respect thereto.

20. The fanfold paper stack supply hopper of claim 19 wherein said hinge assembly independently supports said base member and stop member of said tray for pivotal movement, and wherein a linkage assembly connects said base member to said stop member to enable said base member and said stop member to assume the nested relation in the storage position and have the 90° included angle relation when the supply hopper is in its operative erected position.

21. The fanfold paper stack supply hopper of claim 17 wherein said base member of said tray includes a first surface adapted to support a stack of fanfold paper, and a second surface substantially opposite thereto forming an extension of said housing when said tray is collapsed into its compact substantially flat arrangement for storage.

* * * * *